United States Patent
Click

(10) Patent No.: US 9,859,835 B2
(45) Date of Patent: Jan. 2, 2018

(54) ELECTRIC POWER CONVERSION DESIGN FOR LIQUID FUELED VEHICLES

(71) Applicant: Bryan Click, Avenue, MD (US)

(72) Inventor: Bryan Click, Avenue, MD (US)

(73) Assignee: Bryan E. Click, Avenue, MD (US)

( * ) Notice: Subject to any disclaimer, the term of this patent is extended or adjusted under 35 U.S.C. 154(b) by 290 days.

(21) Appl. No.: 14/942,233

(22) Filed: Nov. 16, 2015

(65) Prior Publication Data

US 2016/0141934 A1    May 19, 2016

Related U.S. Application Data

(60) Provisional application No. 62/079,604, filed on Nov. 14, 2014.

(51) Int. Cl.
| | | |
|---|---|---|
| *H02K 5/00* | (2006.01) | |
| *H02P 27/04* | (2016.01) | |
| *H02K 7/00* | (2006.01) | |

(52) U.S. Cl.
CPC ............. *H02P 27/04* (2013.01); *H02K 7/006* (2013.01)

(58) Field of Classification Search
CPC ........ H02K 7/006; B60K 7/0007; B60K 1/00; B60K 2007/0046; B62J 6/12
USPC ............ 310/91, 67 A, 75 R, 75 C; 180/65.1, 180/65.6, 65.31, 65.51
See application file for complete search history.

(56) References Cited

U.S. PATENT DOCUMENTS

| | | | | |
|---|---|---|---|---|
| 7,658,251 B2 * | 2/2010 | James | ................... | B60K 7/0007 180/65.51 |
| 8,596,391 B2 | 12/2013 | Kshatriya | | |
| 2005/0045392 A1 * | 3/2005 | Maslov | ....................... | B60L 8/00 180/65.51 |
| 2005/0052080 A1 | 3/2005 | Maslov | | |
| 2006/0283644 A1 * | 12/2006 | Matsueda | ................. | B62L 1/00 180/206.6 |
| 2008/0236910 A1 | 10/2008 | Kejha | | |
| 2009/0114461 A1 * | 5/2009 | Clark | ......................... | B60L 7/24 180/65.1 |
| 2011/0011656 A1 * | 1/2011 | Poulsen | .................... | B60K 6/26 180/65.25 |
| 2012/0138374 A1 * | 6/2012 | Pezzuti | ................... | B60S 13/00 180/15 |

* cited by examiner

*Primary Examiner* — Thanh Lam
(74) *Attorney, Agent, or Firm* — Robert Gray

(57) ABSTRACT

A cylindrical direct drive AC induction electric motor and an adapter plate comprises an electric power conversion design for liquid fueled vehicles. For front-wheel drive vehicles, an adapter plate replaces the spindle, the motor is bolted to the adapter plate and the vehicle wheel is bolted directly to the lug studs. For rear-wheel drive vehicles, each end of the rear axle is cut off. Using the adapter plate, the motor directly attaches to the end of the "pipe." Also, a single-piece, trailer type axle could completely replace the axle. For independent rear suspension, the adapter plate bolts in place of the wheel bearing assembly and the wheel is attached to the motor. In all of these cases, the original internal combustion engine, transmission, and all other drive components, along with the exhaust system and fuel tank, are removed to make room for batteries and components of the electric drive system.

9 Claims, 2 Drawing Sheets ved from the design to make room for batteries and other components of the electric drive system.

ELECTRIC POWER CONVERSION DESIGN FOR LIQUID FUELED VEHICLES

CROSS-REFERENCE TO RELATED APPLICATIONS

This Application claims the benefit of U.S. Provisional Application No. 62/079,604, filed Nov. 14, 2014, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to vehicle power train systems and in particular to an electric power conversion design for liquid fueled vehicles. The OPEC oil embargo of 1973, as well as several subsequent events, advised Americans that for the future, our ability to rely on petroleum-based fuels is questionable. At that time, gasoline was under 35 cents per gallon. Since then, we have seen the price rise, and currently the price of gasoline is over three dollars per gallon in most cities. Not just scarcity, but the cost of these fuels is driving consumers to seek alternate energy sources for their transportation needs. Electric power from solar, wind, hydroelectric, and geothermal sources, as well as more conventional fossil fuel sources, provides reliable and economical energy to keep America moving. Manufacturers would like to find an economical and effective way to convert the production of new vehicles that have proven to be popular among purchasers to the use of electric power. An electric power conversion design for liquid fueled vehicles, which may be effected as a modification of an existing vehicle without making major design changes to the vehicle's overall design, would resolve this problem.

SUMMARY OF THE INVENTION

Accordingly, the invention is directed to an electric power conversion design for liquid fueled vehicles. The conversion requires the use of a cylindrical direct drive AC induction electric motor and an adapter plate. For front-wheel drive vehicles, an adapter plate replaces the spindle. Keeping all other steering components, the motor is then bolted to the adapter plate and the vehicle wheel is bolted directly to the lug studs. For rear-wheel drive vehicles, each end of the rear axle is cut off. Using the adapter plate, the motor directly attaches to the end of the "pipe." Also, a single-piece, trailer type axle could completely replace the axle. For independent rear suspension, the adapter plate bolts in place of the wheel bearing assembly and the wheel is attached to the motor. In all of these cases, the original internal combustion engine, transmission, and all other drive components, along with the exhaust system and fuel tank, are removed from the design to make room for batteries and other components of the electric drive system.

With little to no modifications, the electrical powered conversion wheels could be installed on a trailer, RV, or tractor. The existing wheels on a trailer, RV, or tractor would be replaced in much the same manner as above by removing the existing wheel and attaching the motor to the existing axel via an adapter plate. The new wheel is then mounted to the motor.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate four embodiments of the invention and together with the description, serve to explain the principles of the invention.

DETAILED DESCRIPTION OF THE INVENTION

Figure 1:
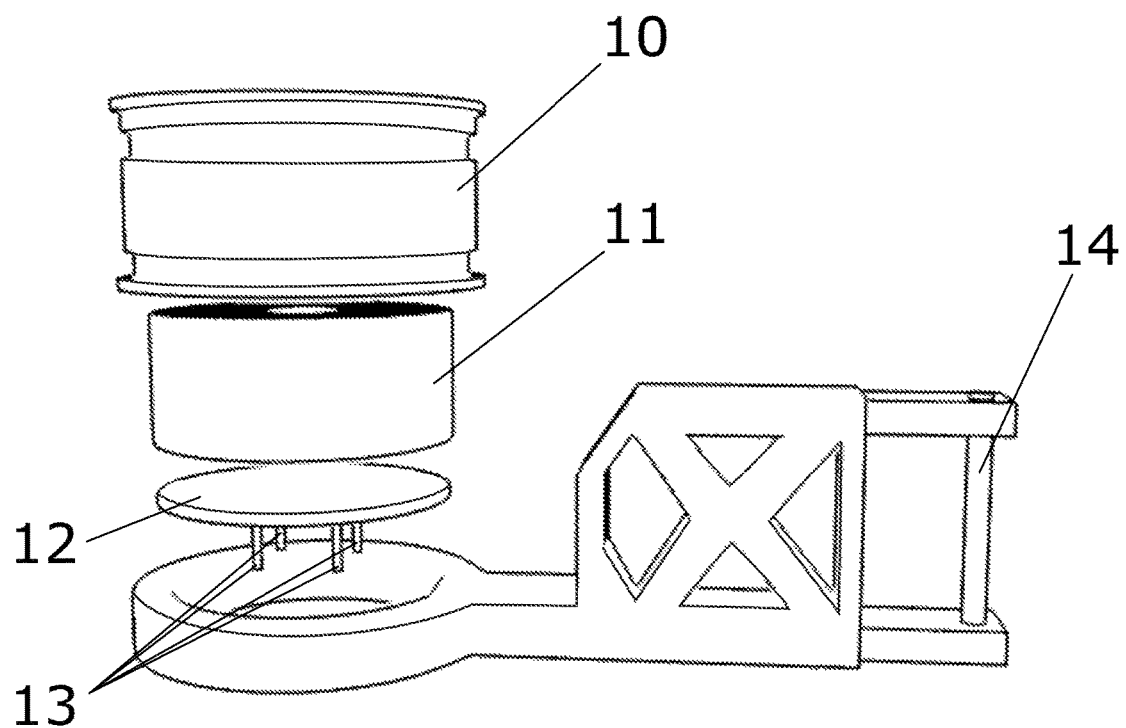
FIG. 1 is a side perspective view of the first exemplary embodiment for use with a motorcycle, displaying the wheel 10, the electric motor 11, the adapter plate 12, the lug studs 13, and the swingarm 14.
Figure 2:
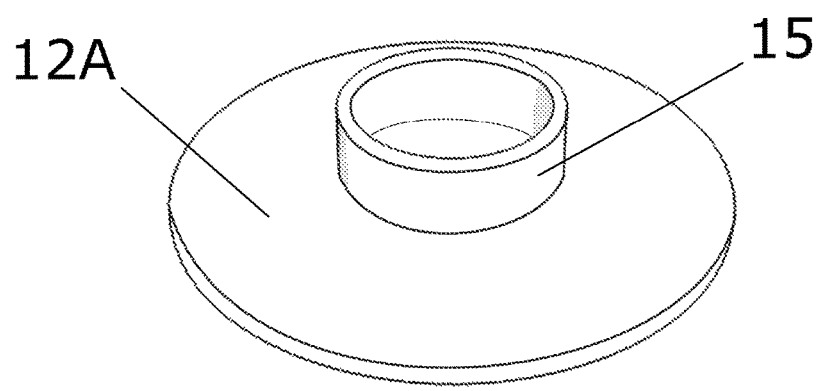
FIG. 2 is a top perspective view of the spindle adapter plate component of the second exemplary embodiment for use with a rear-wheel drive vehicle, displaying the spindle adapter plate 12A, and the flange 15.
Figure 3:
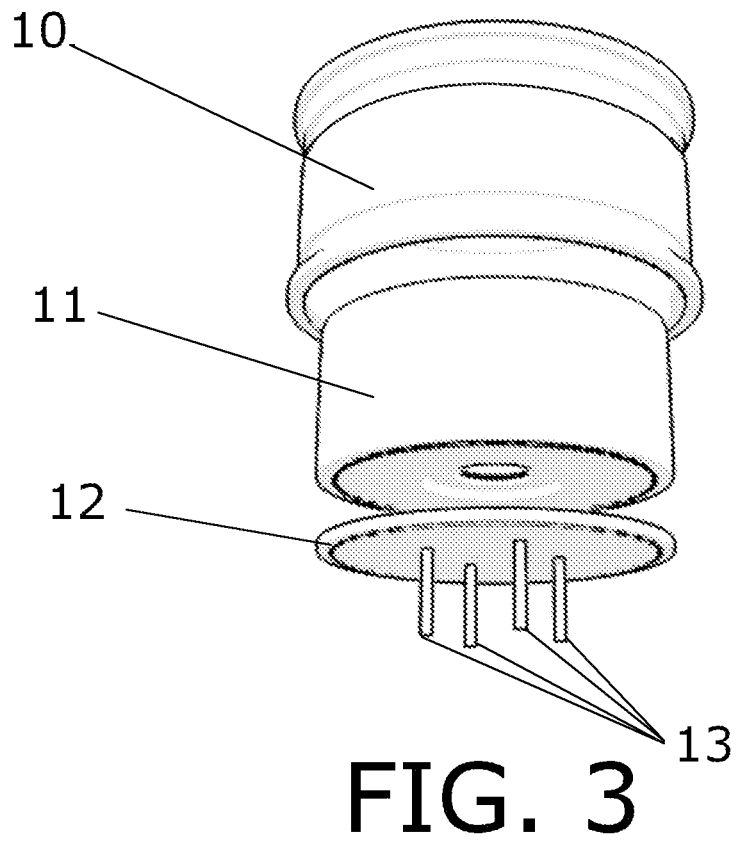
FIG. 3 is a side perspective view of the third exemplary embodiment for use with vehicles with independent rear suspension, displaying the wheel 10, the electric motor 11, the adapter plate 12, and the lug studs 13.
Figure 4:
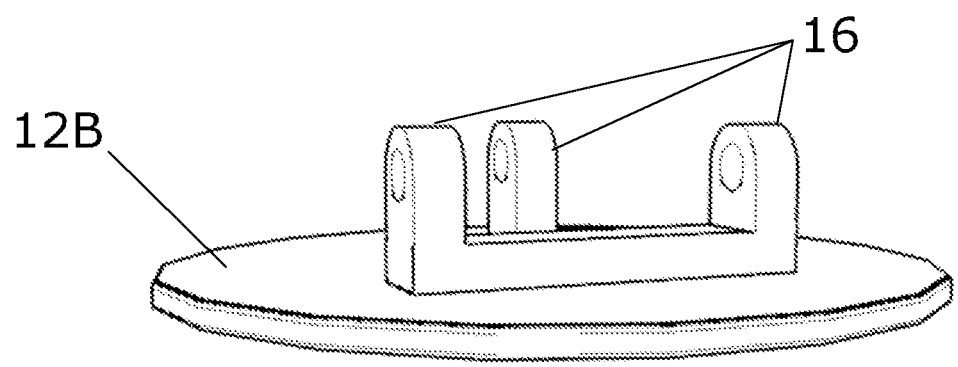
FIG. 4 is a side perspective view of the spindle replacement plate component of the fourth exemplary embodiment for use with a front-wheel drive vehicle, displaying the spindle replacement plate 12B, and the protrusions 16.

Referring now to the invention in more detail, the invention is directed to an electric power conversion kit for liquid fueled vehicles.

It is to be understood that the invention is intended for installation as original equipment by the vehicle manufacturer. Alternate embodiments, intended for installation as an aftermarket modification by the owner of the vehicle, or by a repair or customizing shop, are contemplated.

The first exemplary embodiment is intended for installation on a motorcycle. The rear wheel of the motorcycle is replaced with an automobile type rear wheel 10. An electric motor 11 and an adapter plate 12 are installed inside the wheel 10, supplying power to the wheel by direct drive. The electric motor 11 is reversible and cylindrical in shape, enabling maximum power generation in the space provided. The double-sided swing arm of the motorcycle is replaced with a single sided swingarm 14, allowing the electric motor 11 to be bolted directly to the swingarm 14, and the wheel 10 to the motor 11.

With the original gasoline engine, fuel pump, fuel tank, and exhaust system removed, spaces originally occupied by those components become available for batteries and control systems, which are designed and contoured to bolt into those available spaces. The control systems may use regenerative braking, which could allow for the removal of the hydraulic brake systems. Alternately, hydraulic braking may be used in addition to the regenerative braking.

The second exemplary embodiment is intended for installation on a rear-wheel drive vehicle (such as a car, truck, RV, or tracter), and is substantially similar in structure and function to the first exemplary embodiment, with the following modifications. The swingarm 14 is omitted from the design. Each end of the rear axle of the vehicle is cut off prior to installation. The design of the adapter plate 12 is modified into a spindle adapter plate 12A, wherein the lug studs 13 are omitted from the front surface of the adapter plate 12 and a raised flange 15 is provided on the rear surface, enclosing the end of the axle. Using the spindle adapter plate 12A, the electric motor 11 is directly affixed to the end of the "pipe." The lug studs 13 are instead provided on the wheel 10. An alternate embodiment, wherein a single-piece, trailer type axle replaces the original rear-wheel drive axle completely, is also contemplated.

The third exemplary embodiment is intended for installation on a vehicle with independent rear suspension (such as a car, truck, RV, or tracter), and is substantially similar in structure and function to the first exemplary embodiment, with the following modifications. The swingarm 14 is omitted from the design. The adapter plate 12 bolts in place of the wheel bearing assembly and the wheel 10 is affixed to the electric motor 11.

The fourth exemplary embodiment is intended for installation on a front-wheel drive vehicle (such as a car, truck, RV, or tracter), and is substantially similar in structure and function to the first exemplary embodiment, with the following modifications. The swingarm 14 is omitted from the design. The design of the adapter plate 12 is modified into a spindle replacement plate 12B, and completely replaces the spindle on the vehicle, which is removed. The spindle replacement plate 12B provides a plurality of semicircular protrusions 16, which enable the installation technician to secure the spindle replacement plate 12B in the location of the removed spindle. Keeping all other steering components, the electric motor 11 is then bolted to the spindle replacement plate 12B and the wheel 10 is bolted directly to the lug studs 13.

The fifth exemplary embodiment is intended for installation on a towing trailer, and is substantially similar in structure and function to the first exemplary embodiment, with the following modifications. The swingarm 14 is omitted from the design. Each end of the axle of the tow trailer is cut off prior to installation. The design of the adapter plate 12 is modified into a spindle adapter plate 12A, wherein the lug studs 13 are omitted from the front surface of the adapter plate 12 and a raised flange 15 is provided on the rear surface, enclosing the end of the axle. Using the spindle adapter plate 12A, the electric motor 11 is directly affixed to the end of the "pipe." The lug studs 13 are instead provided on the wheel 10. The batteries and control system may be mounted under the trailer frame. Electrical connections would be made as usual to the electrical system of the towing vehicle but would include additional connections to connect the vehicle's computer system to the motor control system.

Preferably, in all embodiments the electric motor 11 is of a compact, high-powered AC induction type. Alternate embodiments, wherein the electric motor 11 is of a permanent magnet AC type, or some other type of electric motor, are also contemplated. The permanent magnet AC electric motor enjoys the advantages of being lighter, and amenable to the use or less expensive materials in manufacturing.

Other alternate embodiments, wherein existing popular vehicle designs are converted to hybrid power rather than pure electric power, are also contemplated. In such alternate embodiments, any wheels which are not used as drive wheels for liquid-fueled propulsion are used as mounting locations for the electric motors 11. Batteries do not need to be as large as in a pure electric power conversion, and may be concealed behind body panels or in the spare tire location. Computer systems of both the liquid fuel engine and the electric motors 11 may be linked to enable the liquid fuel engine to shut down when not needed, or run at idling level RPMs to recharge the batteries via the vehicle recharging system as needed.

For all embodiments, the control and recharging systems and the batteries are conventional for electric vehicles, but are contoured to fit into spaces which are vacated by the removal of the liquid-fueled engine, transmission, exhaust system, and fuel tank. Preferably, the conversion design is provided in various versions to fit any recently manufactured motorcycle, passenger sedan, pickup truck, RV, or other highway vehicle. However, the conversion design could easily be modified to also work with tractors or trailers. Additionally, the installed batteries may be used to power accessories in the vehicle. In the case of RVs or Trailers, the battery could be used a secondary source of power for accessories and appliances. Preferably, all embodiments provide one or more power cords for recharging the batteries, which may be plugged into any standard three-pronged wall outlet.

To use the first, second, third, fourth, and fifth exemplary embodiments, the user plugs the power cords into wall outlets to recharge the batteries. Upon completion of recharging, the user unplugs and stores the power cords and operates the vehicle in much the same manner as a liquid-fueled vehicle with an automatic transmission, since the direct drive nature of the drive train obviates the need to shift gears when moving forward.

The wheel 10, the electric motor 11, the adapter plate 12, the spindle adapter plate 12A, the spindle replacement plate 12B, the lug studs 13, and the swingarm 14 are preferably manufactured from rigid, durable materials which are corrosion resistant and provide substantial structural strength, such as steel and aluminum alloy. The electric motor 11 is preferably manufactured from rigid, durable materials such as steel, aluminum alloy, brass, copper alloy, and plastic.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. An electric power conversion design for liquid fueled vehicles comprising:
   a. a wheel;
   b. a reversible cylindrical electric motor;

c. said reversible cylindrical electric motor being mounted within said wheel;
d. an adapter plate;
e. said adapter plate being affixed to said reversible cylindrical electric motor and mounted within said wheel;
f. wherein said reversible cylindrical electric motor and adapter plate provide power to said wheel by direct drive.

2. The electric power conversion design for liquid fueled vehicles of claim 1, wherein said adapter plate is a spindle adapter plate; said spindle adapter plate having a raised flange opposite said reversible cylindrical electric motor; said spindle adapter plate being configured to attach to a cylindrical axel.

3. The electric power conversion design for liquid fueled vehicles of claim 1, wherein said adapter plate has lug studs opposite said reversible cylindrical electric motor; said adapter plate being configured to bolt in place of a wheel bearing assembly.

4. The electric power conversion design for liquid fueled vehicles of claim 1, wherein said adapter plate is a spindle replacement plate; said spindle replacement plate having a plurality of semicircular protrusions; said spindle replacement plate being configured to replace a vehicle spindle such that said wheel is bolted directly to lug studs.

5. The electric power conversion design for liquid fueled vehicles of claim 1, wherein said electric motor is a compact, high powered ac induction electric motor.

6. The electric power conversion design for liquid fueled vehicles of claim 1, wherein said electric motor is a permanent magnet ac electric motor.

7. An electric power conversion design for liquid fueled vehicles comprising:
a. a wheel;
b. a reversible cylindrical electric motor;
c. said reversible cylindrical electric motor being mounted within said wheel;
d. an single sided motorcycle swing arm;
e. said single sided motorcycle swing arm being attached to said reversible cylindrical electric motor mounted within said wheel;
f. wherein said reversible cylindrical electric motor and said single sided motorcycle swing arm provide power to said wheel by direct drive;
g. wherein said single sided motorcycle swing arm is configured to attach to a motorcycle body.

8. The electric power conversion design for liquid fueled vehicles of claim 6, wherein said electric motor is a compact, high powered ac induction electric motor.

9. The electric power conversion design for liquid fueled vehicles of claim 6, wherein said electric motor is a permanent magnet ac electric motor.

* * * * *